United States Patent
Lee et al.

(10) Patent No.: US 11,520,814 B2
(45) Date of Patent: Dec. 6, 2022

(54) DATA PROCESSING METHOD AND DEVICE USING ARTIFICIAL INTELLIGENCE

(71) Applicant: MIND AI INC, Seoul (KR)

(72) Inventors: Jung Hwan Lee, Seongnam-si (KR); John H. Doe, Seoul (KR); Kyoo Ho Lee, Incheon (KR)

(73) Assignee: MIND AI INC, Seoul (KR)

( * ) Notice: Subject to any disclaimer, the term of this patent is extended or adjusted under 35 U.S.C. 154(b) by 304 days.

(21) Appl. No.: 16/751,045

(22) Filed: Jan. 23, 2020

(65) Prior Publication Data

US 2020/0159753 A1  May 21, 2020

Related U.S. Application Data

(63) Continuation of application No. PCT/KR2018/008419, filed on Jul. 25, 2018.

(30) Foreign Application Priority Data

Jul. 25, 2017 (KR) .......................... 10-2017-0093849

(51) Int. Cl.
*G06F 40/205* (2020.01)
*G06F 16/33* (2019.01)
(Continued)

(52) U.S. Cl.
CPC ........ *G06F 16/3344* (2019.01); *G06F 16/338* (2019.01); *G06F 40/284* (2020.01); *G06N 5/041* (2013.01)

(58) Field of Classification Search
CPC ............. G06F 16/3329; G06F 16/3344; G06F 16/338; G06F 40/205; G06F 40/284;
(Continued)

(56) References Cited

U.S. PATENT DOCUMENTS 8,719,005 B1 * 5/2014 Lee .................... G06N 5/025
704/9
10,430,712 B1 * 10/2019 Reed ................... G06N 5/046
(Continued)

FOREIGN PATENT DOCUMENTS

KR   10-2008-0072673 A   8/2008
KR     10-0980579 B1    9/2010

OTHER PUBLICATIONS

Wong W, "Practical approach to knowledge-based question answering with natural language understanding and advanced reasoning", Jul. 2007, arXiv preprint arXiv:0707.3559. Jul. 24, 2007, pp. 1-166.*

(Continued)

*Primary Examiner* — Olujimi A Adesanya
(74) *Attorney, Agent, or Firm* — Knobbe, Martens, Olson & Bear, LLP

(57) ABSTRACT

This application relates to a new paradigm of data reasoning based on natural language inputs. A data structure based on the new paradigm is a canonical of a basic data structure in the shape of a triangle. The basic data structure includes a first node being a primary node, a second node being a context node, a third node being a resultant node. The basic data structure also includes a first link connecting the first and second nodes and configured to assign an attribute of abductive reasoning between the first and second nodes and a second link connecting the second and third nodes and configured to assign an attribute of inductive reasoning between the second and third nodes. The basic data structure further includes a third link connecting the first and third nodes and configured to assign an attribute of deductive reasoning between the first and third nodes.

15 Claims, 26 Drawing Sheets

(51) Int. Cl.
*G06F 16/338* (2019.01)
*G06F 40/284* (2020.01)
*G06N 5/04* (2006.01)

(58) Field of Classification Search
CPC ........ G06N 20/00; G06N 5/022; G06N 5/041; G06N 5/046
See application file for complete search history.

(56) References Cited

U.S. PATENT DOCUMENTS

| | | | |
|---|---|---|---|
| 2011/0218855 A1* | 9/2011 | Cao | G06Q 30/0251 705/14.49 |
| 2012/0158636 A1 | 6/2012 | Bowers et al. | |
| 2013/0211841 A1* | 8/2013 | Ehsani | G06F 40/35 704/270.1 |
| 2014/0129504 A1* | 5/2014 | Soon-Shiong | G06T 9/00 706/47 |
| 2015/0019462 A1 | 1/2015 | De et al. | |
| 2015/0026163 A1* | 1/2015 | Haggar | G06F 16/24578 707/723 |
| 2015/0254330 A1* | 9/2015 | Chan | G06F 16/219 707/613 |
| 2015/0286708 A1 | 10/2015 | Tao | |
| 2018/0011927 A1* | 1/2018 | Lee | G06F 16/93 |
| 2019/0244122 A1* | 8/2019 | Li | G06N 20/00 |

OTHER PUBLICATIONS

International Search Report received in International Patent Application No. PCT/KR2018/008419 dated Oct. 29, 2018.
Written Opinion received in International Patent Application No. PCT/KR2018/008419 dated Oct. 29, 2018.

\* cited by examiner

FIG. 10B

```
structure/part of speech
(ROOT
  (S
    (NP (NNP Angela))
    (VP (VBZ is)
      (NP (DT a) (NN person)))
    (. .)))

dependencies
(nsubj person-4 Angela-1)
(cop person-4 is-2)
(det person-4 a-3)
(root ROOT-0 person-4)
```

FIG. 11A

```
structure/part of speech
(ROOT
  (SBARQ
    (WHNP (WP Who))
    (SQ
      (VP (VBZ brings)
        (NP (DT a) (NN bag))))
    (. ?)))

dependencies
(nsubj brings-2 Who-1)
(root ROOT-0 brings-2)
(det bag-4 a-3)
(dobj brings-2 bag-4)
```

FIG. 12A

```
structure/part of speech
(ROOT
  (S
    (SBAR (IN If)
      (S
        (S
          (NP (DT a) (NN person))
          (VP (VBZ lives)
            (PP (IN in)
              (NP (DT a) (NN place)))))
        (, ,)
        (CC and)
        (S
          (NP (DT the) (NN person))
          (VP (VBZ spends)
            (NP (NN time))
            (ADVP (RB there))))))
    (, ,)
    (NP (DT the) (NN person))
    (VP (VBZ loves)
      (NP (DT the) (NN place)))
    (. .)))

dependencies
(mark lives-4 If-1)
(det person-3 a-2)

(nsubj lives-4 person-3)
(advcl loves-18 lives-4)
(case place-7 in-5)
(det place-7 a-6)
(nmod:in lives-4 place-7)
(cc lives-4 and-9)
(det person-11 the-10)

(nsubj spends-12 person-11)
(conj:and lives-4 spends-12)
(advcl loves-18 spends-12)
(dobj spends-12 time-13)
(advmod spends-12 there-14)
(det person-17 the-16)

(nsubj loves-18 person-17)
(root ROOT-0 loves-18)
(det place-20 the-19)
(dobj loves-18 place-20)
```

FIG. 13A

```
(ROOT
  (SQ (NNP Does)
    (NP (NNP Angela))
    (VP (VB love)
      (NP (NNP Canada)))
    (. .)))

dependencies
(dep love-3 Does-1)
(nsubj love-3 Angela-2)
(root ROOT-0 love-3)
(dobj love-3 Canada-4)
```

Applications are LIMITLESS

Drug discovery | Diagnosis, new treatment paradigms | Personal secretary | Shopping assistant Asset management | Automated coding | Virtual mentors /teachers | And more

DATA PROCESSING METHOD AND DEVICE USING ARTIFICIAL INTELLIGENCE

CROSS-REFERENCE TO RELATED APPLICATIONS

This application is a continuation application, and claims the benefit under 35 U.S.C. §§ 120 and 365 of PCT Application No. PCT/KR2018/008419, filed on Jul. 25, 2017, which is hereby incorporated by reference. PCT/KR20181008419 also claimed priority to Korean Patent Application No. 10-2017-0093849 filed on Jul. 25, 2017 which is hereby incorporated by reference.

BACKGROUND

Technical Field

The disclosure relates to various data processing methods and devices using artificial intelligence.

Description of Related Technology

Development of Artificial Intelligence (AI) systems has brought many innovations in modern society. AI systems have already showed competitive capability in matches with humans, such as chess or Baduk. In many fields, an AI system showed competitiveness beyond human ability.

Lately, the development mainstream of AI is in the form of neural networks, based on deep learning. However, the forms cannot provide an essential method of linear, logical reasoning. AI, based on a neural network implementation of deep learning requires a large amount of data to train the neural network, and has difficulties in generalizing to various domains, even if showing superior functions in a specific domain.

Accordingly, a paradigm based on a new symbolic model for overcoming the disadvantages of AI system which is based on deep learning is needed.

SUMMARY

Provided is, as a data processing method by artificial intelligence, a data processing method by a basic data structure in the shape of a triangle, the basic data structure is configured with a first node being a primary node, a second node being a context node, a third node being a resultant node, a first link connecting the first node to the second node and configured to assign an attribute of abductive reasoning between the first node and the second node, a second link connecting the second node to the third node and configured to assign an attribute of inductive reasoning between the second node and the third node, and a third link connecting the first node to the third node and configured to assign an attribute of deductive reasoning between the first node and the third node. The data processing method includes: receiving a natural language input; establishing the basic data structure based on the natural language input, wherein the establishing of the basic data structure includes at least one of: analyzing a verb, a first object, and a second object included in the natural language representation, and assigning the first object to the first node and the second object to the third node when a relation between the first object and the second object is the same or similar entity and the first object is a sub class of the second object; and assigning the first object to the first node and the second object to the second node based on the analysis of the verb included in the language and the analysis indicating that the second object included in the natural language represents a feature of the first object included in the natural language; receiving a natural language query; analyzing the received natural language query to determine which ones of the first node, the second node, the third node, the first link, the second link, and the third link included in the basic data structure a verb, a third object, and a fourth object included in the natural language query are mapped to, and generating a natural language response to the natural language query; and displaying the natural language response.

There are provided a data processing method and a data processing computing apparatus based on artificial intelligence, which are not limited to a specific domain, and without having to perform a large amount of data for training a neural network in artificial intelligence.

BRIEF DESCRIPTION OF DRAWINGS

Hereinafter, the meaning of the disclosure will be described with reference to the accompanying drawings.

FIGS. 10A and 10B show a relation in which a canonical is parsed according to an embodiment of the disclosure.

FIGS. 11A, 11B, and 110 show a canonical that finds a response to a query, according to an embodiment of the disclosure.

FIGS. 12A and 12B show a canonical expanded according to an embodiment of the disclosure.

FIGS. 13A and 13B show a parser and a canonical in response to a query according to an embodiment of the disclosure.

DETAILED DESCRIPTION

Figure 1:
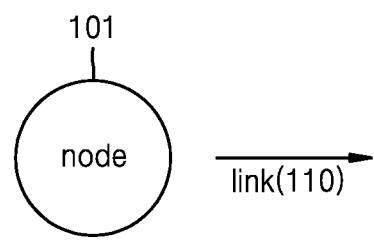
FIG. 1 shows a node and a link according to an embodiment of the disclosure.

Provided is, as a data processing method by artificial intelligence, a data processing method by a basic data structure in the shape of a triangle, the data basic data structure configured with a first node being a primary node, a second node being a context node, a third node being a resultant node, a first link connecting the first node to the second node and configured to assign an attribute of abductive reasoning between the first node and the second node, a second link connecting the second node to the third node and configured to assign an attribute of inductive reasoning between the second node and the third node, and a third link connecting the first node to the third node and configured to assign an attribute of deductive reasoning between the first node and the third node, the data processing method including: receiving a natural language input; establishing the basic data structure based on the natural language input, wherein the establishing of the basic data structure includes at least one of: analyzing a verb, a first object, and a second object included in the natural language, and assigning the first object to the first node and the second object to the third node when a relation between the first object and the second object is the same or similar entity and the first object is a sub class of the second object; and assigning the first object to the first node and the second object to the second node based on the analysis of the verb included in the language and the analysis indicating that the second object included in the natural language represents a feature of the first object included in the natural language; receiving a natural language query; analyzing the received natural language query to determine which ones of the first node, the second node, the third node, the first link, the second link, and the third link included in the basic data structure a verb, a third object, and a fourth object included in the natural language query are mapped to, and generating a natural language response to the natural language query; and displaying the natural language response.

The establishing of the basic data structure based on the natural language input may include analyzing the verb, the first object, and the second object included in the natural language, and assigning the verb to the third link when the relation between the first object and the second object is the same or similar entity.

The establishing of the basic data structure based on the natural language input may include assigning the verb to the first link when the second object included in the natural language represents the feature of the first object, according to the analysis of the verb included in the natural language.

At least one of the first node, the second node, the third node, the first link, the second link, and the third link may further include another whole, basic data structure included in the corresponding node or the corresponding link, according to complexity of the natural language.

The data processing method may further include at least one of expanding an additional node from the first node, expanding an additional node from the second node, and expanding an additional node from the third node, based on complexity of the natural language.

In the expanding of the additional node from the first node, the first node may become a context node in an expanded basic data structure, and the additional node may become a resultant node in the expanded basic data structure.

In the expanding of the additional node from the first node, the first node may become a context node in an expanded basic data structure, and the additional node may become a primary node in the expanded basic data structure.

In the expanding of the additional node from the second node, the second node may become a primary node in an expanded basic data structure, and the additional node may become a context node in the expanded basic data structure.

In the expanding of the additional node from the second node, the second node may become a primary node in an expanded basic data structure, and the additional node may become a resultant node in the expanded basic data structure.

In the expanding of the additional node from the third node, the third node may become a primary node in an expanded basic data structure, and the additional node may become a context node in the expanded basic data structure.

In the expanding of the additional node from the third node, the third node may become a primary node in an expanded basic data structure, and the additional node may become a resultant node in the expanded basic data structure.

The first object, the second object, the third object, and the fourth object may be a word configured with a natural language or a combination of words configured by the natural language form.

Provided is a computer-readable recording medium storing a computer command for performing a data processing method by a basic data structure in the shape of a triangle, the basic data structure configured with a first node being a primary node; a second node being a context node, a third node being a resultant node; a first link connecting the first node to the second node and configured to assign an attribute of abductive reasoning between the first node and the second node, a second link connecting the second node to the third node and configured to assign an attribute of inductive reasoning between the second node and the third node, and a third link connecting the first node to the third node and configured to assign an attribute of deductive reasoning between the first node and the third node. The data processing method includes: receiving a natural language input; establishing the basic data structure based on the natural language input, wherein the establishing of the basic data structure includes at least one of: analyzing a verb, a first object, and a second object included in the natural language, and assigning the first object to the first node and the second object to the third node when a relation between the first object and the second object is the same or similar entity and the first object is a sub class of the second object; and assigning the first object to the first node and the second object to the second node based on the analysis of the verb included in the language and the analysis indicating that the second object included in the natural language represents a feature of the first object included in the natural language; receiving a natural language query; analyzing the received natural language query to determine which ones of the first node; the second node; the third node, the first link; the second link; and the third link included in the basic data structure a verb, a third object, and a fourth object included in the natural language query are mapped to, and generate a natural language response to the natural language query; to display the natural language response.

Provided is a computer apparatus which processes data by a basic data structure in the shape of a triangle; the basic data structure configured with a first node being a primary node, a second node being a context node, a third node being a resultant node, a first link connecting the first node to the second node and configured to assign an attribute of abductive reasoning between the first node and the second node, a second link connecting the second node to the third node and configured to assign an attribute of inductive reasoning between the second node and the third node, and a third link connecting the first node to the third node and configured to assign an attribute of deductive reasoning between the first node and the third node. The computer apparatus includes; a user interface configured to receive a natural language input and a natural language query, and displaying a natural language response; and a processor, wherein the processor is configured to receive the natural language input; analyze the natural language input to establish the basic data structure, wherein the establishing of the basic data structure includes at least one of; analyzing a verb, a first object, and a second object included in the natural language, and assigning the first object to the first node and the second object to the third node when a relation between the first object and the second object is the same or similar entity and the first object is a sub class of the second object; and assigning the first object to the first node and the second object to the second node based on the analysis of the verb included in the language and the analysis indicating that the second object included in the natural language represents a feature of the first object included in the natural language; receive the natural language query; and analyze the received natural language query to determine which ones of the first node, the second node, the third node, the first link, the second link, and the third link included in the basic data structure a verb, a third object, and a fourth object included in the natural language query are mapped to and generate a natural language response to the natural language query.

Hereinafter, embodiments of the disclosure will be described in detail with reference to the appended drawings in order for one of ordinary skill in the art to easily embody the disclosure. However, the disclosure can be implemented in various different forms, and is not limited to the embodiments described herein. Also, in the drawings, parts irrelevant to the description are not shown in order to definitely describe the disclosure, and throughout the entire specification, similar components are assigned like reference numerals.

Although terms used in the specification are used to describe various components, the components should not be limited by the terms. These terms are only used to distinguish one component from another.

It will be understood that when a component is referred to as being "connected" to another component, it can be "directly connected" to the other component or "electronically connected" to the other component with an intervening component. It will be understood that when a certain component is referred to as being "connected" to another component, it can perform data communications with the other component through signal transmission and reception.

In addition, the expression that a part "comprises" or "includes" some components is interpreted as covering a non-exclusive inclusion, and each operation or process describing the method does not include only the operations described, but it is not explicitly included or may include other operations that are inherent in the operation or processor. Similarly, one or more devices or sub-systems or components or structures or components proceeding to "comprising" may include other devices, other sub-systems, other components, other structures, sub-systems or additional components.

Unless otherwise defined, all technical and scientific terms used herein have the same meaning as commonly understood by one of ordinary skill in the art to which the disclosure belongs. The electronic devices, methods and embodiments provided herein are for illustrative purposes only and are not intended to limit the scope of the rights.

Hereinafter, the disclosure will be described in detail with reference to the accompanying drawings. The word "exemplary" is used herein to mean "used as an example or an example". Any embodiment described herein as "exemplary" is by no means necessarily to be interpreted as having advantages over other embodiments.

A data processing theory according to the disclosure may be referred to as various other terms of the same meaning. For example, the data processing theory may be considered to have the same meaning as a data reasoning theory, an information estimation theory or a data estimation theory by artificial intelligence. Throughout the disclosure, abductive is used as the meaning of abductive reasoning, inductive is used as the meaning of inductive reasoning, and deductive is used as the meaning of deductive reasoning.

First, to understand a data reasoning theory according to the disclosure and a data processing or data reasoning method based on the data estimation theory, it is necessary to understand an information theory.

Information may be defined as a change in potential.

Information:=$\Delta$Potential

Also, measurement may be defined as a change in information.

Measurement:=$\Delta$Information

Further, in regard to a functional description of information, "meaning" in the information theory is written as a "change in state". Accordingly, it will be understood that measurement is when a change from one state to another state causes a change from a third state to a fourth state. That is, it will be understood that measurement has the same intrinsic characteristic as a causal relation.

For example, when a person has opened a door, it may be considered that the person has performed a specific kind of measurement by opening the door; the change in the state of the doorknob being turned correlating with the change in the door becoming opened.

1. Door is closed. (initial state)
2. Open the door (state change)
3. Door is opened (resultant state according to a causal relation of opening the door)

An embodiment of the disclosure will be described in more detail with reference to the accompanying drawings, based on the concept.

FIG. 1 shows a node and a link according to an embodiment of the disclosure.

In the disclosure, a new type of network component configured with a node and a link will be described. Referring to FIG. 1, a node 101 may be connected to another node through a link 110.

According to the disclosure, a node may serve as a link, and a link may serve as a node. Alternatively, a node or link may itself include a canonical. A canonical, which means a basic data structure established according to the disclosure, will be described in more detail with reference to FIG. 3, later. This method is called an "augmented node-link network", an "augmented graph network", or an "augmented topological network".

Figure 2:
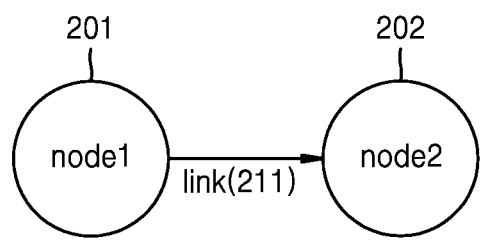
FIG. 2 shows a connection of nodes and a link according to an embodiment of the disclosure.
Figure 3:
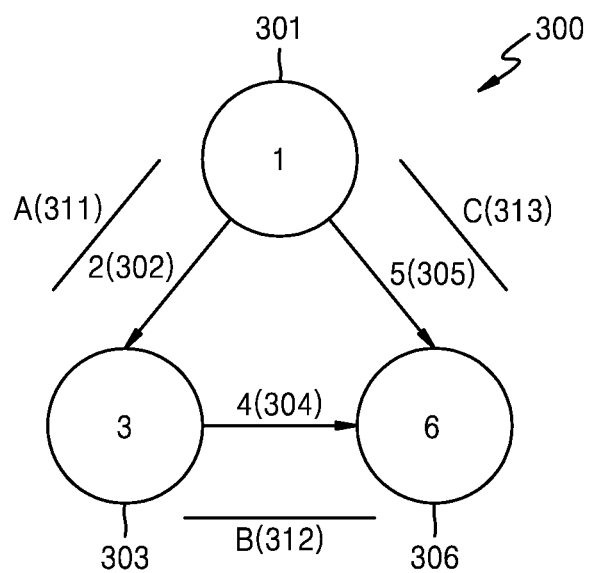
FIG. 3 shows a canonical 300 formed by connections of nodes and links according to an embodiment of the disclosure.

FIG. 2 shows a connection of nodes and a link according to an embodiment of the disclosure, node1 201 may be connected to node2 202 through a link 211, FIG. 3 shows a canonical 300 formed by connections of nodes and links according to an embodiment of the disclosure. A data connection structure formed by nodes and links constituting the canonical 300 according to the disclosure is called a basic data structure, and in the disclosure, the basic data structure is referred to as a canonical.

As shown in FIG. 3, each node may be assigned a number as an identifier. The number may indicate a stored object. The canonical 300 or a closer may be defined in the form of three connections. A connection A 311 of the canonical 300 may be defined as node1 301=link2 302=>node3 303. A connection B 312 of the canonical 300 may be defined as node3 303=link4 304=>node6 306, and likewise, a connection C 313 of the canonical 300 may be defined as node1 301=link5 305=>node6 306.

The connections A, B, and C may connect three slots or nodes indicated by identifiers such as three unique numbers 1, 3, and 6 to each other. The identifiers may indicate three objects in a typical storage such as a hash table (or a dictionary structure). Likewise, the three connections A, B, and C may have links associated with themselves and having their own unique numbers 2, 4, and 5.

Each of the three objects may have a parent list associated with itself. The parent list may be canonicals and connections including the object. For example, an object corresponding to the node1 301 may have a parent list including the connection A 311, the connection C 313, and the canonical 300 including the connection A 311 and the connection C 313.

Figure 4:
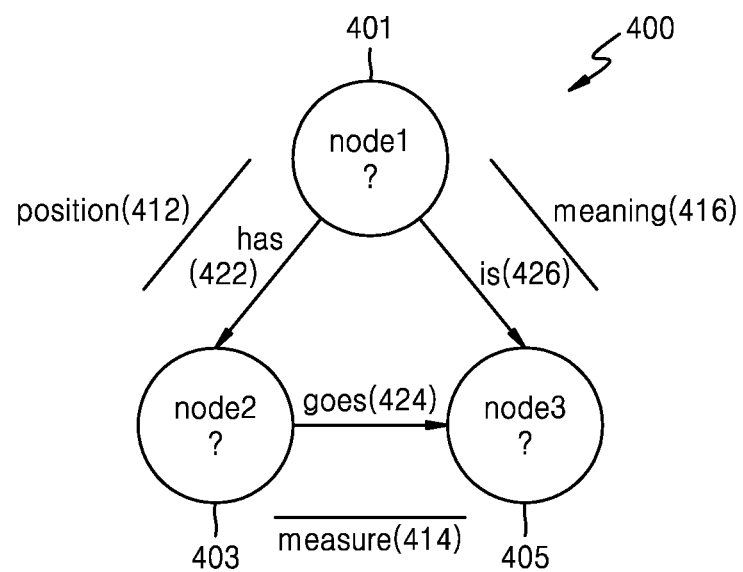
FIG. 4 shows a typical canonical 400 according to an embodiment of the disclosure.

FIG. 4 shows the typical canonical 400 according to an embodiment of the disclosure. The canonical 400 shown in FIG. 4 may be used to perform a semantic function. Herein, the semantic function means a logic based on meanings of used symbols and/or symbols such as words.

A typical canonical describes a canonical type according to the disclosure. A canonical according to the disclosure may perform data processing or data reasoning by applying a condition or constraint in "selection". The reasoning is a symbolic reasoning. Data reasoning by the canonical 400 may start by defining information content or data with some primitive values. The primitive values may have unique functional attributes.

Primitive symbols to which primitive values are assigned are as follows.

?: query, potential, "some"—most basic primitive (not shown in FIG. 4)
{ }: none, absence, "not" (not shown in FIG. 4.)
}{: all, any, "is"
< >: bind, "has"
><: open, "goes"

The above definitions of the symbols provide a method for understanding of how symbols operate in a data processing or a data reasoning system according to the disclosure. Essentially, the symbols may represent a level on a meaning induced when being positioned at a certain location in a canonical according to the disclosure.

The definitions are an embodiment for understanding of how symbols operate in the system according to the disclosure, and other symbols may be applied according to a user's selection. Essentially, the symbols may represent a level of semantics induced when a component is positioned at a certain location in the canonical. The primitive symbols may provide some basic meanings when a word having a meaning as a node is positioned in a canonical according to the disclosure. All of three nodes and three links in a canonical may need not to have other values except for a "default value" or an unfilled value. However, appropriately arranging information/data in a structural form according to node-link may be an essentially important task.

As shown in FIG. 4, no primitive values are assigned to nodes 401, 403, and 405. "has" 422 connecting node1 401 to node2 403 may be information for setting a position 412. When information is described as a change in potential, the potential may be actually considered as a position 412. In FIG. 4, a primitive value assigned to each node is "?", which may represent that any value may be assigned. That is, "?" may represent a state in which no value is assigned or a default value.

In FIG. 4, a link "goes" 424 may be information for setting measurement 414. The link may perform a potential operation, and perform a change to a new state to generate a new potential.

A meaning of the measurement may be described by a link "is" 426. The link "is" 426 may be a meaning 416 of measurement, and a change in state may result in a change from the node1 401 to the node3 405.

Figure 5:
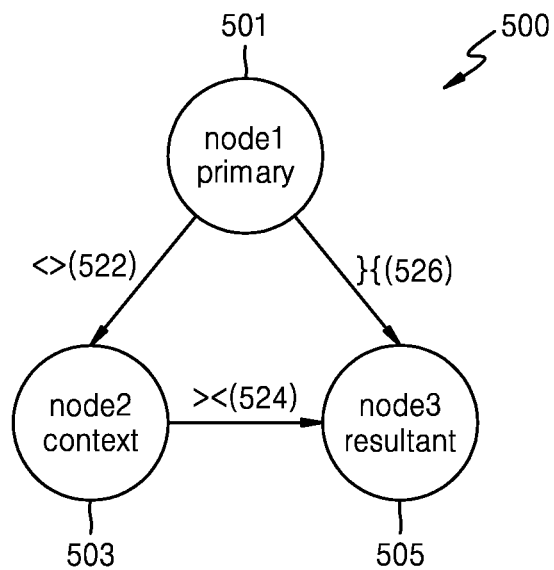
FIG. 5 shows an embodiment in which primitive values are assigned to the canonical of FIG. 4.

FIG. 5 shows an embodiment in which primitive values are assigned to the canonical of FIG. 4.

In FIG. 5, a canonical 500 may be expressed by node1 501, node2 503, node3 505, link < > 522, link >< 524, and link}{ 526. The link < > 522 may have a bind function, the link >< 524 may have an open function, and the link}{ 526 may have a satisfy function.

In FIG. 5, a primitive value of the node1 501 may be shown to be primary, a value of the node2 503 may be shown to be context, and a value of node3 505 may be shown to be resultant. However, the values may be not actual values but describe attributes of primitive values.

Figure 6:
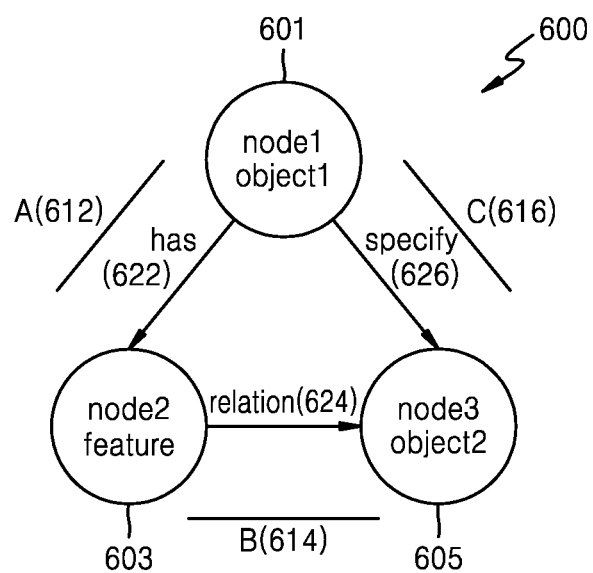
FIG. 6 shows an example of a canonical according to an embodiment of the disclosure.

Connections between nodes and links in a canonical will be described in more detail with reference to FIG. 6. FIG. 6 shows an example of a canonical according to an embodiment of the disclosure.

Herein, in node1 601, the "primary" may be replaced by "object1", and "has" 622 may be understood as the link "< >" 522. In node2 603, "feature" may be located at a position of the "context", and "relation" 624 may satisfy the link "><" 524. In node3 605, object2 may replace the "resultant"?. "specify" 626 may be understood as the link "}{" 526. Through the three nodes and three links, the canonical can be described more clearly.

First, a connection A (object1=has=>feature) 612 may define abductive reasoning related to a query of "how". However, the query is not necessarily limited to "how", and, when there is, for example, a query "Is an article ABC transparent?", an interrogative may correspond to 'what' or 'which'. Because the article as an object is connected to a feature 'transparent', the article and the 'transparent' may be in a relation of abductive reasoning. In another example of "who has a book?", although an interrogative is "who", 'who' and 'book' may be in a relation of abductive reasoning. In contrast, in a query "who is he?", 'who' and 'he' may be in a deductive relation (query). That is, a verb may be determined from a sentence used in a query, and whether a relation between objects in the corresponding query is abductive or deductive may be determined considering a relation between the objects (also referred to as a subject and an object (a complement and an object) in the sentence; however, in the disclosure, for convenience of description, all subjects and objects except for verbs are referred to as objects) in the sentence.—

For example, when a mouse has a definition of an animal with legs, the mouse may be object1 and a feature may be legs. When a bird has a definition of an animal with wings, object1 may be the bird and a feature may be wings. Because both a mouse and a bird belong to animals, "How is the mouse distinguished from the bird?", Through subclasses to which the animals belong may be determined through their "feature".

When a user submits a query "Which animal has wings?", "bird" may be selected, and "mouse" (without the feature—wings) may be excluded without being selected.

The mouse has legs, and the bird has wings. When a user submits a query "Which animal has wings?" with natural language, the object1 (mouse, bird) that is distinguished by the feature through abductive reasoning may be identified.

Then, a connection C (object1=specify=>object2) 616 may be located through deductive reasoning, and answers a query of "what". Like abductive reasoning described above, the query of the deductive reasoning is not limited to a query of "what", and, when a verb and object of a sentence are interpreted, the query may be "who", "which" or "what".

In this case, defining sub classes and super classes will be described. The object1 may be defined as a sub class of the object2, and the object2 may be defined as a super class of the object1. Accordingly, the object1 may inherit a feature of the object2. For simple understanding, the object1 may be considered as a sub category of the object2. The meaning is as follows.

When there is a canonical defining a fact of "a man is mortal", this means that a 'man' has a feature of 'mortal'. When there is "Socrates is a man", a connection of Socrates (object1)=specify=>man (object2) may be possible. Also, its feature may become 'mortal'. Accordingly, because Socrates is a subclass of man and Socrates inherits the feature of man, a conclusion of "Socrates is mortal" may be obtained. In the above example, when the feature is "primate", conclusions of "a man is a primate" and "Socrates is a primate" may be obtained. The reasoning may be called deductive reasoning that is familiar to us.

Finally, a connection B 614 may define inductive reasoning, and mainly relate to a query of "why". Like the above-described reasoning, although inductive reasoning mainly relates to a query of "why", it may relate to another query (for example, "how").

Referring to FIG. 6, a link "relation" 624 may connect the 'feature' of the node2 603 to the object2 of the node3 605. In the connection B 614, the feature may be an intersection between a feature to which a primary object (object1) is bound and a feature interfacing with the "relation" 624.

The connection B 614 will be described in more detail in consideration of the following case.

It is assumed that there are two camera models. A person X may look for a camera having night photography performance. In regard to night photography performance, it is assumed that there is a camera model having a feature of a "strong flash function". The relation is a general relation between a feature and a camera. In this case, the camera may correspond to the object2 in FIG. 6. Also, the "strong flash function" as a feature may satisfy the camera (object2) having a good night photography performance.

When there is another camera model having the feature (strong flash function), it may be estimated that the person X will be interested in the other camera model based on the relation for the camera.

Another example of a topic, "where will we go on a vacation" will be described. A person X may have a spouse and children. Herein, "relation" may be set to "family friendly". Accordingly, a location or vacation spots for a vacation may become resultant 605 as object2 in FIG. 6, and a feature related to "family friendly" may be selected.

Figure 7:
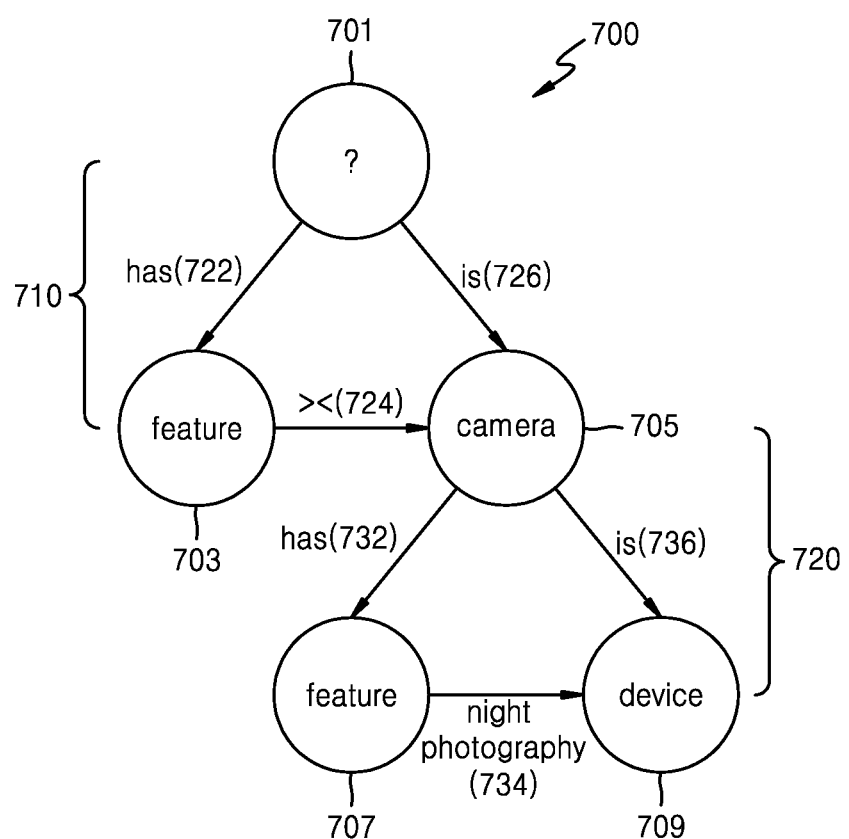
FIG. 7 shows a combination data structure according to an embodiment of the disclosure.

FIG. 7 shows a combination data structure according to an embodiment of the disclosure.

To help understand a combination logic according to FIG. 7, a camera shopping model will be again described. A combination model according to FIG. 7 may be configured with two canonicals, that is, a first canonical 710 and a second canonical 720.

The first canonical 710 may describe various camera models having various features, respectively. Referring to the canonical 720, a camera 705 may inherit a general device 709, and a user may select "night photography" 734 as a relation with a feature 707. Herein, it may be considered that the user wants a camera having all features related to "night photography". Accordingly, as to the canonical 720, a feature specialized for "night photography" in a specific camera model may be selected.

Deductive 736 may show that camera is a device in a general case, and inductive 734 may estimate a certain feature that is inherited in a specific case. By selecting the feature, the system may use abductive reasoning to select a suitable camera model that the user wants to purchase.

Figure 8A:
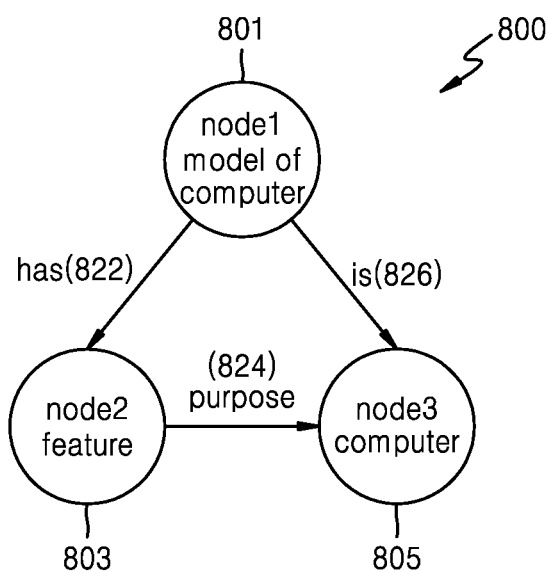
FIGS. 8A, 8B, and 8C show examples in which examples of computer shopping are applied to a canonical, according to an embodiment of the disclosure.
Figure 8B:
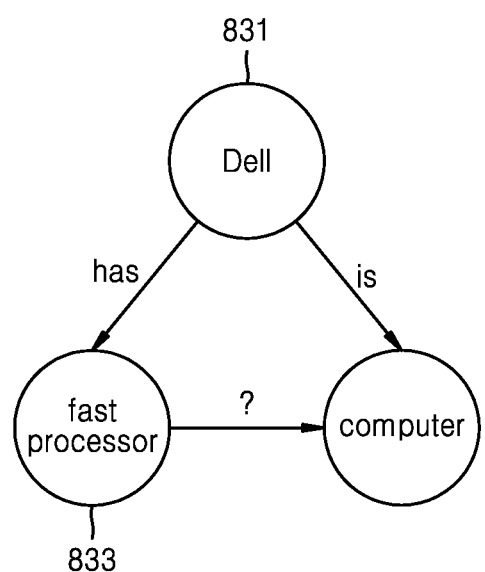
Figure 8C:
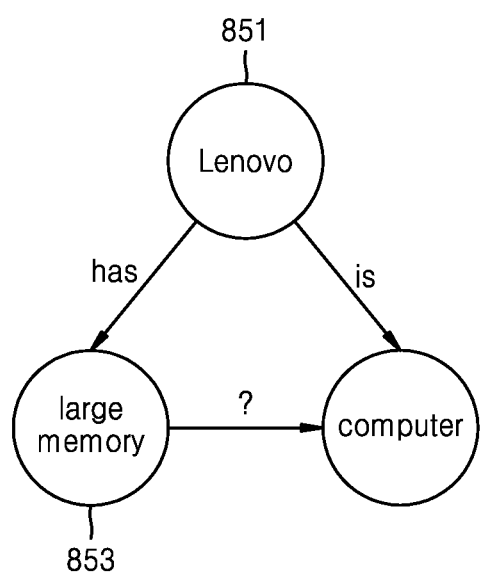

FIGS. 8A, 8B, and 8C show examples in which examples of computer shopping are applied to a canonical, according to an embodiment of the disclosure.

In FIG. 8A, a model of a computer corresponding to node1 801 may represent a sub class. The node1 801 may be a subclass of a computer of node3 805 corresponding to object2, and a user's purchase purpose 824 for a computer may correspond to "relation".

In this case, the feature may be a feature of a computer matching the purchase purpose. As shown in FIG. 8B, when the user's purchase purpose for a computer is games, the user will have a purpose of wanting to purchase a computer having fast processing capability 833. For simple understanding, it is assumed that a Dell computer is a computer having a fast processor and a fast graphics processor, and a Lenovo computer is a computer having a large memory capacity.

Also, a certain user's purchase purpose for a computer may be a large memory capacity 853. As shown in FIG. 8B, a computer that "has" fast processing capability may be a Dell computer 831. The Dell computer 831 which is a sub class "is" a computer (a super class). As shown in FIG. 8C, a computer that "has" a feature of a large memory capacity may be a Lenovo computer 851. The Lenovo computer 851 which is a subclass also "is" a computer (a super class).

This is summarized as follows.

Dell is a computer model.

Lenovo is a computer model.

Accordingly, "computer model" has two matches, Dell and Lenovo.

Feature is summarized as follows.

Dell has a fast processor.

Dell has a fast graphics processor.

Dell has an integrated design.

Accordingly, Dell has three features of fast processor, fast graphics processor, and integrated design.

Lenovo has a large memory capacity.

Lenovo has a good keyboard.

Lenovo has a long warranty period.

Lenovo has three features of large memory capacity, good keyboard, and long warranty period.

Now, the user may put a query to himself/herself. "What model of computer shall I buy?"

This query may be positioned at node1 801, which is a primary in a canonical 800. The query about "what" model (or brand) of computer does a user want may correspond to deductive reasoning. At this time, a query about "what" purpose does the user have in purchasing a computer in "what" model (or brand) of a computer the user wants may be provided. The query about "what purpose" may change in a different way to an expression of "why does the user want to purchase the computer?". Accordingly, the query in the purchase purpose of the computer, this may correspond to a connection 824 defining inductive reasoning.

When the purchase purpose of computer is "games", two features accompanied by the purpose may be included. That is, the two features may be "fast processor" and "fast graphics processor".

Accordingly, when the purchase purpose for a computer is "games", the user may search for features related to the purpose of "games". The user may select "fast processor" and "fast graphics processor", and a computer model having the features may be a Dell computer. This connection may be abductive reasoning.

Accordingly, a result—Dell computer—may be obtained for the query and selection.

Figure 9A:
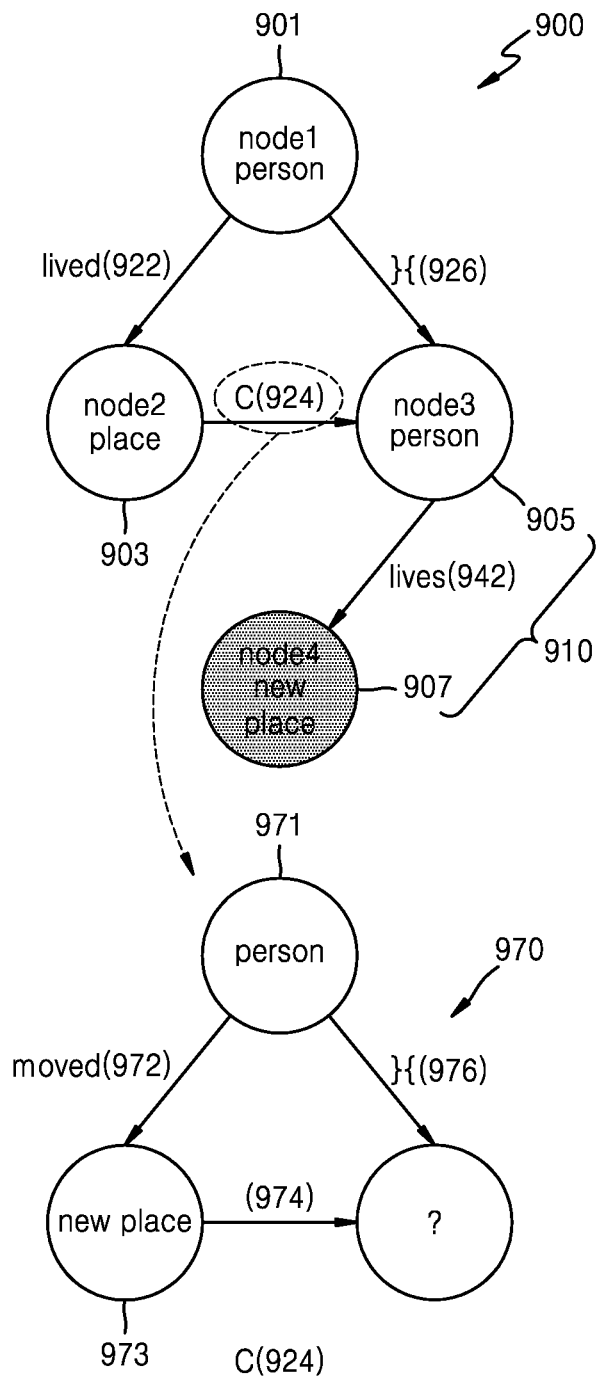
FIGS. 9A and 9B show data processing of applying a canonical model through a natural language input, according to an embodiment of the disclosure.

FIGS. 9A and 9C show data processing of applying a canonical model through a natural language input, according to an embodiment of the disclosure.

A feature of a canonical according to the disclosure may be that, when a user makes a natural language input, data reasoning is possible. As described above, inputs and outputs of the data reasoning theory according to the disclosure may be made with a natural language. Because the natural language form is familiar to users, users can intuitively understand the natural language.

A natural language parser may convert a natural language input—regardless of whether the natural language is English or other languages—into a tree structure having a parts-of-speech tag and a list of universal dependencies.

In FIG. 9A, canonicals 900 and 970 may represent that, when a person lived at a certain place and moved to a new place, data reasoning that the person lives at the new place is performed. In the canonical 900, a link C 924 between node2 903 and node3 905 may represent a relation between person being a value of the node3 905 and place being a value of the node2 903, and the new canonical 970 may be formed from the link C 924. The canonical 970 may represent the link C 924. A situation that a person corresponding to node1 of the canonical 900 lived at the place corresponding to the node2 903 and lives at node4 which is a new place may be described as a relation that the person moved to some place.

Accordingly, in the canonical 970 of the link C 924, a node 971 may be assigned person, and place may be assigned to a node 973. Also, an attribute of moved 972 between the nodes 971 and 973 may be assigned to abductive reasoning. Because the link C 924 is expanded to form the canonical 970, FIG. 9A is an example showing an enhanced topology network.

Figure 9B:
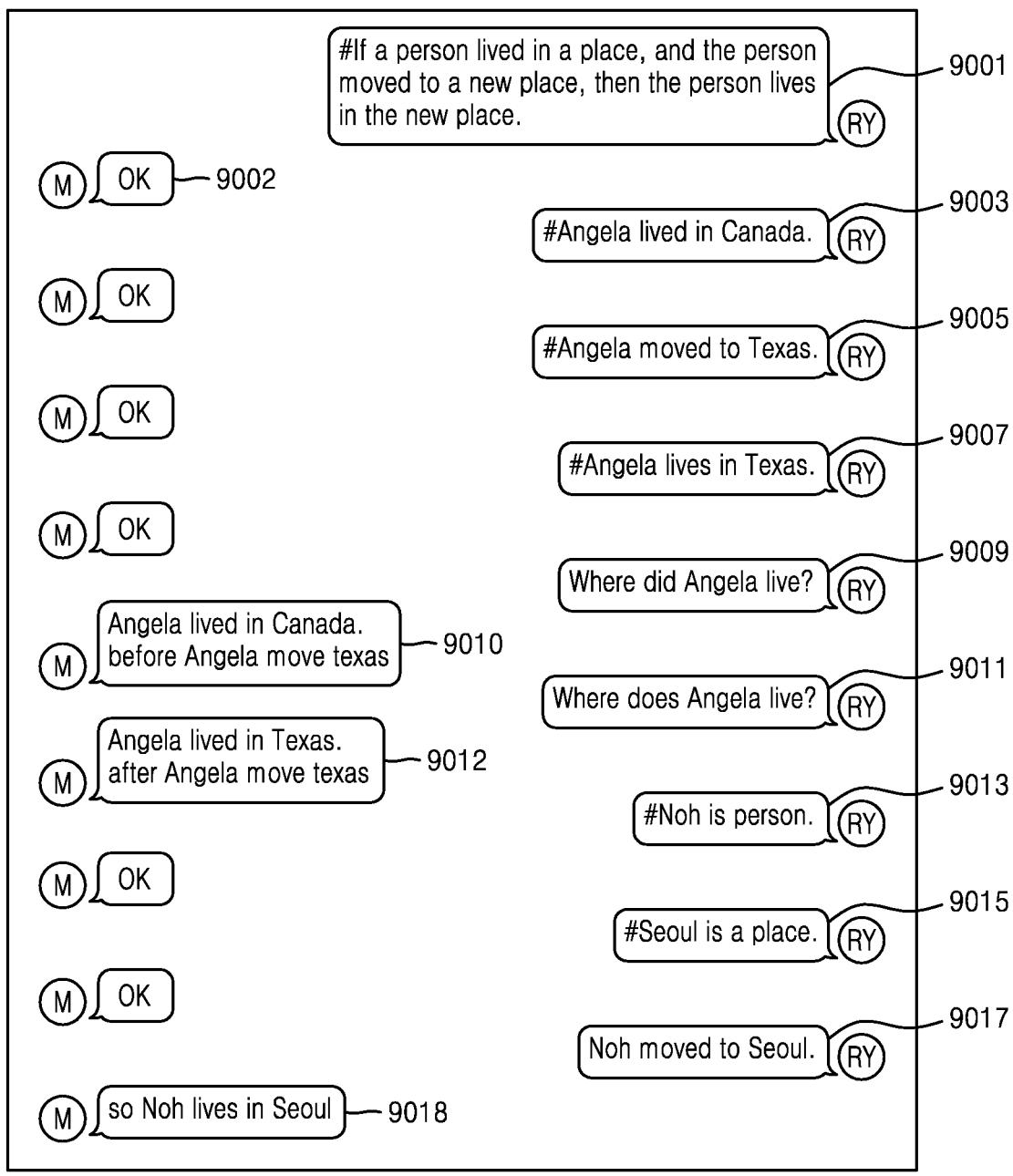

Referring to FIG. 9B, a user may make a natural language input.

User input 1—"if a person lived in a place, and the person moved to a new place, then the person lives in the new place." (9001)

The user input 1 may be a process of inputting a rule to the canonical 900. The system according to the disclosure may apply the corresponding input to the canonical 900.

The system may simply respond "OK". (9002).

User input 2 "Angela lived in Canada." (9003)

By the input, Angela may correspond to the node3 905, and a place Canada may be considered as a feature "has" through a behavior that Angela lived.

The node3 905 may correspond to person which is a super class of Angela, and person and place may have a relation 924 through "lives".

User input 3—"Angela moved to Texas." (9005)
User input4—"Angela lives in Texas". (9007)

In this case, because a new place Texas is a second feature, the new place Texas may correspond to the node4 through a combination canonical 910. A link connecting the node3 to the node4 may become "lives" of which action performs "has" through a currently living behavior.

After the inputs are completed, the user may submit the following queries.

After a canonical is configured by the inputs, the system may respond to the user's inputs. The user's queries are as follows. User's query1—"Where did Angela live?" (9009)

The user's query about "Where did Angela live?" may have a logic established through the canonicals 900 and 970.

In the user's query1, 'did' is a past tense. Because the user input includes "lived", the canonical 900 before 'moved' may be selected to find an answer to the query.

In this case, a canonical for 'move' may be the canonical 970 according to the link C 924 of FIG. 9A, as described above. System response 1—"Angela lived in Canada before Angela moved to Texas." (9010)

User's query 2—"Where does Angela live?"

The user's query about where does Angela live may have a logic established through the canonical 910. That is, when the system analyzes verbs included in a sentence of the query, the system may determine that the verbs are present tenses (does . . . live), which causes the system to have a canonical after 'moved'. Accordingly, the system may generate an answer by using the canonical 910 connecting the node3 to the node4.

Figure 10A:
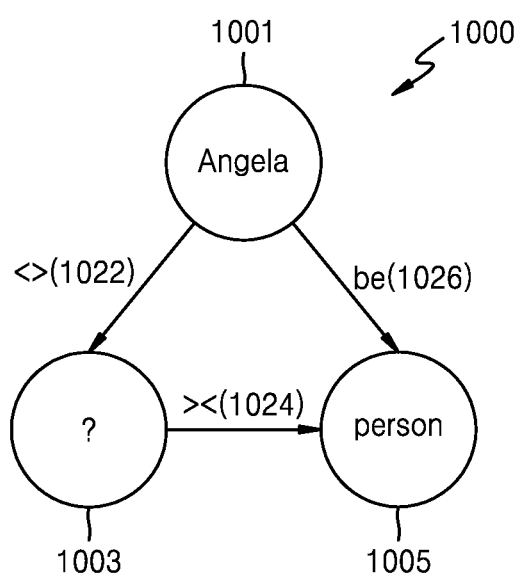

System answer2 "Angela lives in Texas after Angela moved to Texas." FIGS. 10A and 10B show a relation in which a canonical is parsed according to an embodiment of the disclosure.

Some canonical configurations may depend on some meanings of inputs from a parser, however, in many cases, canonicals may be formed naturally from a list of dependencies. This will be described in detail, below. First, FIG. 10A shows a canonical 1000 for a parser input, and FIG. 10B shows parsing content according to a parser input.

The parser may be the Stanford Parser as an open source application written in Java.

The parser may be selected by a user, and data reasoning according to the disclosure may be applied by using other parsers. When a user makes a natural language input "Angela is a person" to the system, the system may establish the canonical 1000 as shown in FIG. 10A. In this input, "Angela" may be a proper noun, "is" may be a be verb, and "person" may be a regular noun. According to FIG. 10B, the parser may parse a proper noun to NNP, a be verb to VBZ, and a regular noun to NN. Two sets of data may be acquired through the parser, wherein the two sets of data may be, respectively, a sentence structure below ROOT and a dependency relation between words in the sentence as shown below dependencies.

First, to fill slots (nodes and links) in a canonical model, subject dependency starting from "nsubj" may be combined with copula dependency starting from "cop".

Accordingly, "Angela" 1001 may become a primary value of node1, and "be" 1026 being a basic form of "is" may be put on a "is" link of the canonical.

Also, "person" 1005 may be positioned at node3 as object2 according to a connection to the "be" link.

By the method, two objects and a link positioned to the right side of a canonical triangle may be completed.

According to the above example, an actual form of a data structure may have six slots as follows.

Primary: "Angela"
Bind: < > (Default value) Context: ? (Default value) Test: >< (Default value) Satisfy: "be"
Resultant: "person" In the above example, a natural language sentence "Angela is a person" may be analyzed by parsing and analysis, as follows. The system may determine that an object 'Angela' is a proper noun and an object 'person' is a regular noun, by a verb 'is'. Accordingly, the system may determine that two objects Angela and person are the same (or similar) entity. (Angela=person) Accordingly, the proper noun Angela may be positioned at node1 1001, which is a primary node belonging to a sub class, and person belonging to a super class may be positioned at node3 1005, which is a resultant node. Because Angela and person are in a deductive (materialization) relation, a link 1026 may be assigned an attribute 'be'.

A configuration of the canonical 1000 according to FIG. 10A when a natural language sentence input is "Angela is pretty" may be considered below.

An object 'Angela' and an adjective 'pretty' may be determined from the natural language sentence input "Angela is pretty" by a verb 'is' through parsing and analysis. Because 'pretty' is an adjective, 'pretty' may not satisfy entity identity (or such similarity) with the object 'Angela', and therefore, 'pretty' may be assigned to node2 1003, which is a context node.

Also, Angela may be positioned at node1 1001, which is a primary node, and because the two objects 'Angela' and 'pretty' are in an abductive relation, a link 1022 may be assigned an attribute 'has'.

Figure 11B:
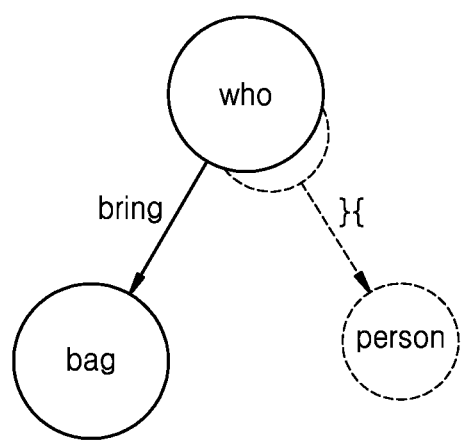

That is, it may be considered that 'Angela' has a 'pretty' attribute. FIGS. 11A, 11B, and 110 show a canonical that finds a response to a query, according to an embodiment of the disclosure. A user may submit a query to a computer system based on a natural language input "Angela brings a bag" which is an existing input.

The user's query may be "Who brings a bag?". FIG. 11A shows parsing content for the query. Herein, because it is obvious that 'who' is a specification of 'who' itself, 'person' may be searched by the definition. Actually, an interrogative 'who' may be defined as "what person" or "who is the person" in ontology.

Therefore, 'who' may obviously satisfy 'person'.

According to nsubj dependency by parsing shown in FIG. 11A, the system may move 'who' toward the front direction of a dotted line on the canonical, and 'bring' to the center between the nodes.

Because 'bag' is at a position of an object as shown in FIG. 11B, 'bag' may be positioned at the rear side on the canonical.

Figure 11C:
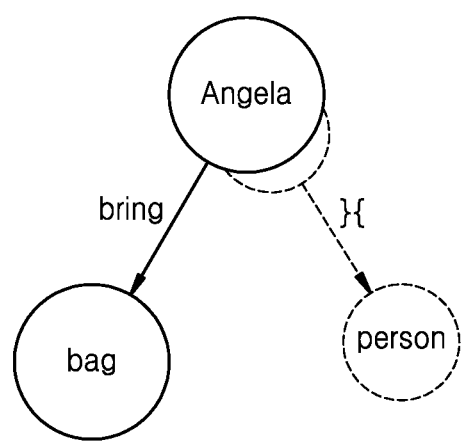

As shown in FIG. 11C, 'Angela' may have already been defined as 'person' according to the previous natural language input.

Figure 12B:
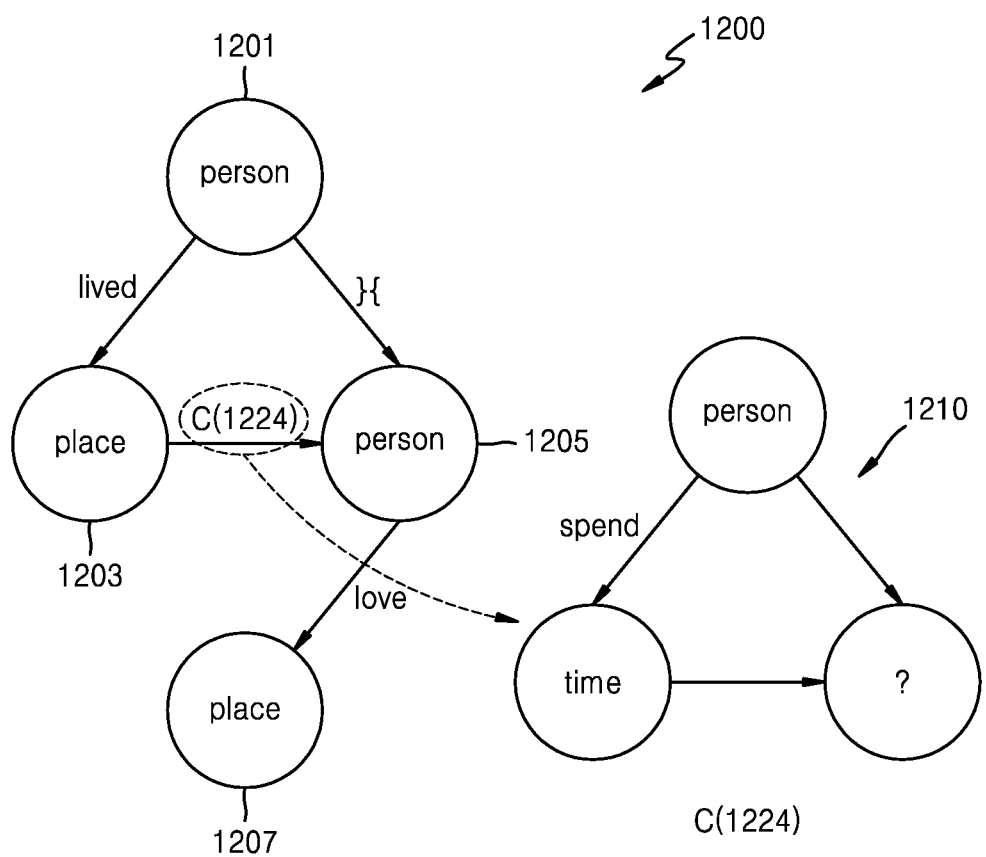

Accordingly, a resultant output may become "Angela brings a bag". A more complicated structure in which three nsubj's exist in parser results will be described. FIGS. 12A and 12B show a canonical expanded according to an embodiment of the disclosure. A more complicated natural language input may be as follows. "If a person lives in a place, and the person spends time there, the person loves the place." As shown from parser content of FIG. 12A, there may be a plurality of nsubj.

Dependency of three nsubj as shown from the parser content may be converted into a canonical positioned on the left side of FIG. 12B. Also, the canonical may form a predicate. All basic ideas in the world and functions thereof may resolve into a system by predicates. Also, a upper or global ontology may be a collection of such predicates. A predicate means a sentence expressed by a natural language in the form of declaring and/or concluding natural phenomena, knowledge, definitions, etc. that humans generally know.

For example, "a man will die someday", "bees gather in sweet-scented flowers", "all objects influenced by gravity fall, and when the objects fall, the positions of the objects change from their initial positions", etc. can be predicates. In a left canonical of FIG. 12b, a link 1224 between a node 1203 corresponding to context 'place' and a node 1205 corresponding to resultant may be represented as a link C 1224. The link C 1224 may be represented by a canonical 1210 shown on the right side of FIG. 12B.

That is, a relation between 'person' of the resultant node 1205 and 'place' of the context node 1203 may be described by the canonical 1210 shown on the right side of FIG. 12B.

That is, a relation between 'person' (node 1205) and 'place' (node 1203) may be, as shown in FIG. 12B, positioned that, when "person spends time" in the subcanonical 1210, 'person' (node 1205) 'love' 'place' (node 1207). It may be observed that the link C 1224 may itself become the canonical 1210. That is, any node or link in a canonical may become another canonical. The canonical 1210 shown on the right side of FIG. 12B may show an additional canonical according to "person spends time". It is assumed that a query input is "Does Angela love Canada?".

Figure 13B:
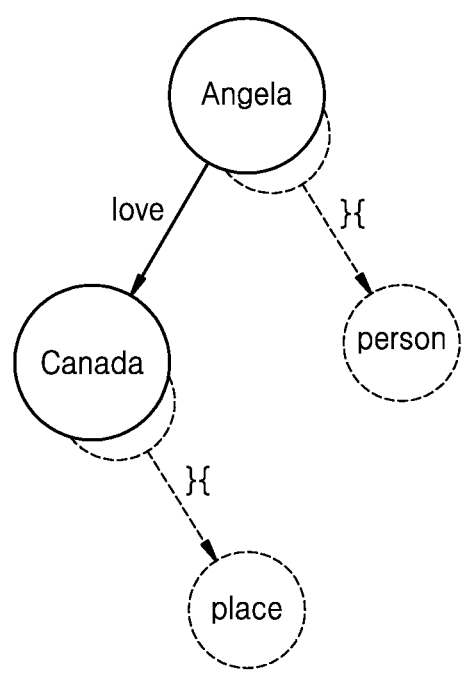

Descriptions for this will be given with reference to FIGS. 13A and 13B. FIGS. 13A and 13B show a parser and a canonical in response to a query according to an embodiment of the disclosure. FIG. 13A is content generated by parsing the sentence "Does Angela love Canada?", and FIG. 13B shows a canonical thereof. The system according to the disclosure may need to apply constraint propagation to the query.

By applying constraint propagation to the query, the sentence may be analyzed as follows. "Angela is the person, and Canada is the place." In regard to the canonical shown on the right side of FIG. 12B, because there is no specified detail about 'Angela', a query "Does Angela spend time?" may be submitted. The query may be a specific case of "person spends time". When an answer to the query is positive, that is, "Angela spends time there", a conclusion of "Angela loves Canada" may be obtained.

This is shown as the canonical of FIG. 13B.

An important rule of a data structure according to the disclosure is as follows. When two different canonicals share an inductive as in FIG. 13B, the two different canonicals may be functionally identical.

Figure 14:
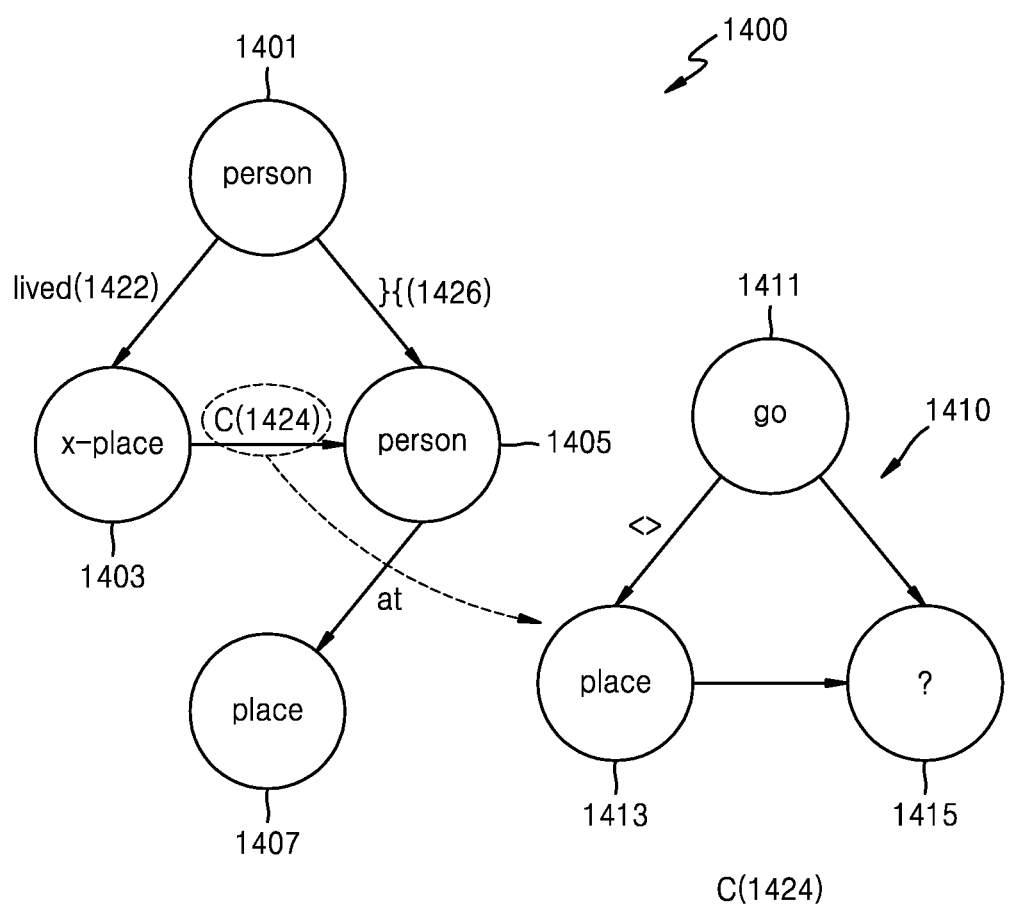
FIG. 14 shows a functional definition of a verb 'go' as a canonical, according to an embodiment of the disclosure.

When a query is "Does Angela love Canada?", the canonical in FIG. 13B satisfies node 1205—love—node 1207 (place) of FIG. 12B. However, to finally satisfy the condition, the link C 1224 of FIG. 12B may need to be satisfied. However, because the system does not yet know the condition—the link C 1224, the system may submit a query about whether the condition the link C 1224 is satisfied. That is, the system may first submit a query "Does Angela spend time?". When an answer to the query is "Angela spends time", the system may determine that the condition—the link C 1224 is satisfied, and conclude that "Angela loves Canada". FIG. 14 shows a functional definition of a verb 'go' as a canonical, according to an embodiment of the disclosure. Particularly, a "functional" definition in ontology according to the disclosure will be described in detail with reference to FIG. 14. A functional definition of a verb 'go' may be, for example, a canonical shown in FIG. 14.

When a person goes somewhere, the system according to the disclosure may observe the context of the verb.

The context may be 'place'. Accordingly, the verb 'go' may be considered to deal with 'place'. Because 'Canada' is 'place', the system may apply the foregoing to a natural language sentence. When a natural language sentence "Angela goes to Canada" is input, the system may conclude that "Angela is 'at' Canada" by verb interpretation as described above. In a canonical 1400, the x-place of a context node 1403 may become any place. In addition, as shown in FIG. 14, a link C 1424 may correspond to a canonical 1410.

Figure 15:
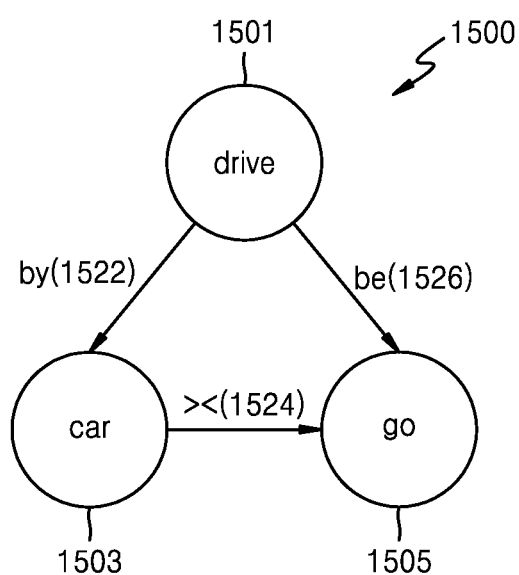
FIG. 15 shows a canonical defining words, according to an embodiment of the disclosure.

FIG. 15 shows a canonical defining words, according to an embodiment of the disclosure.

For example, a natural language sentence "To drive is to go by car" is assumed. 'to drive' and 'to go' may be the equivalent or similar entity.

The reason is because 'to drive' is to go somewhere.

In this aspect, it may be considered that 'to drive' and 'to go' have the equivalent or similar entity.

Accordingly, 'drive' may inherit all attributes of 'go'.

Accordingly, 'drive' may be positioned at a primary node 1501 in a canonical 1500, and 'go' may be positioned at a resultant node 1505.

When there is a natural language input "Angela drives to Canada", a conclusion that Angela is in Canada may be obtained with reference to the canonical of FIG. 15.

Figure 16:
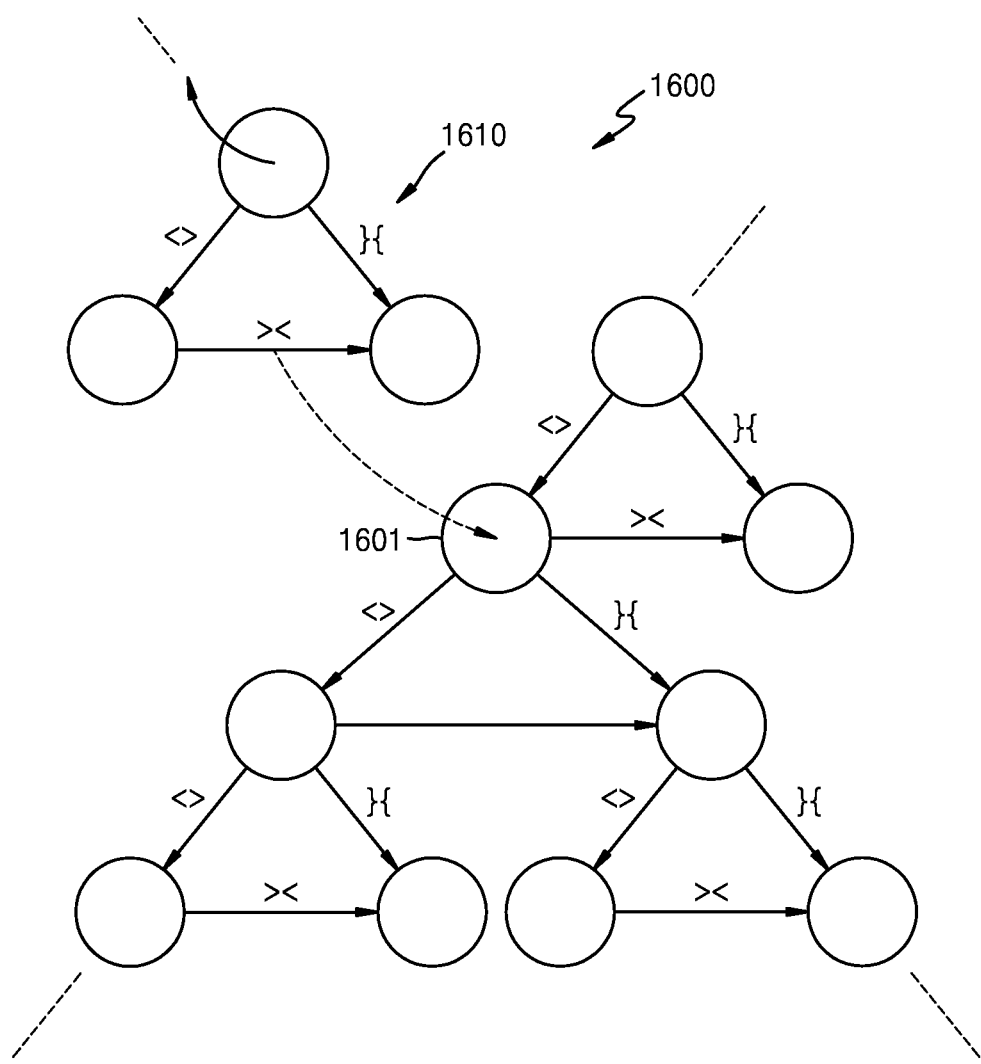
FIG. 16 shows an augmented topological network according to an embodiment of the disclosure.

FIG. 16 shows an augmented topological network according to an embodiment of the disclosure.

Referring to FIG. 16, a primary node 1601 may be replaced by a canonical 1610 corresponding to the primary node 1601.

An augmented topological network may be expressed by the following data structure on a network structure.

Figure 17:
FIG. 17 shows various applications of a data processing method and apparatus according to an embodiment of the disclosure.
Figure 17:
Figure 17:
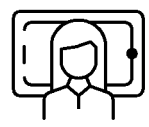
Figure 17:
Figure 17:
Figure 17:
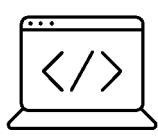
Figure 17:
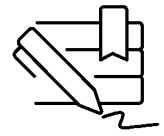
Figure 17:
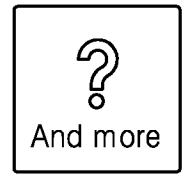

Canonical: Any {
primary: Canonical
context: Canonical
resultant: Canonical
satisfy-link: Canonical bind-link: Canonical
measurement-link: Canonical} In a canonical positioned at a center, the primary node 1601 may correspond to the canonical 1610. FIG. 17 shows various applications of a data processing method and apparatus according to an embodiment of the disclosure, FIG. 18 shows system hardware and canonical formation according to an embodiment of the disclosure.

Figure 18:
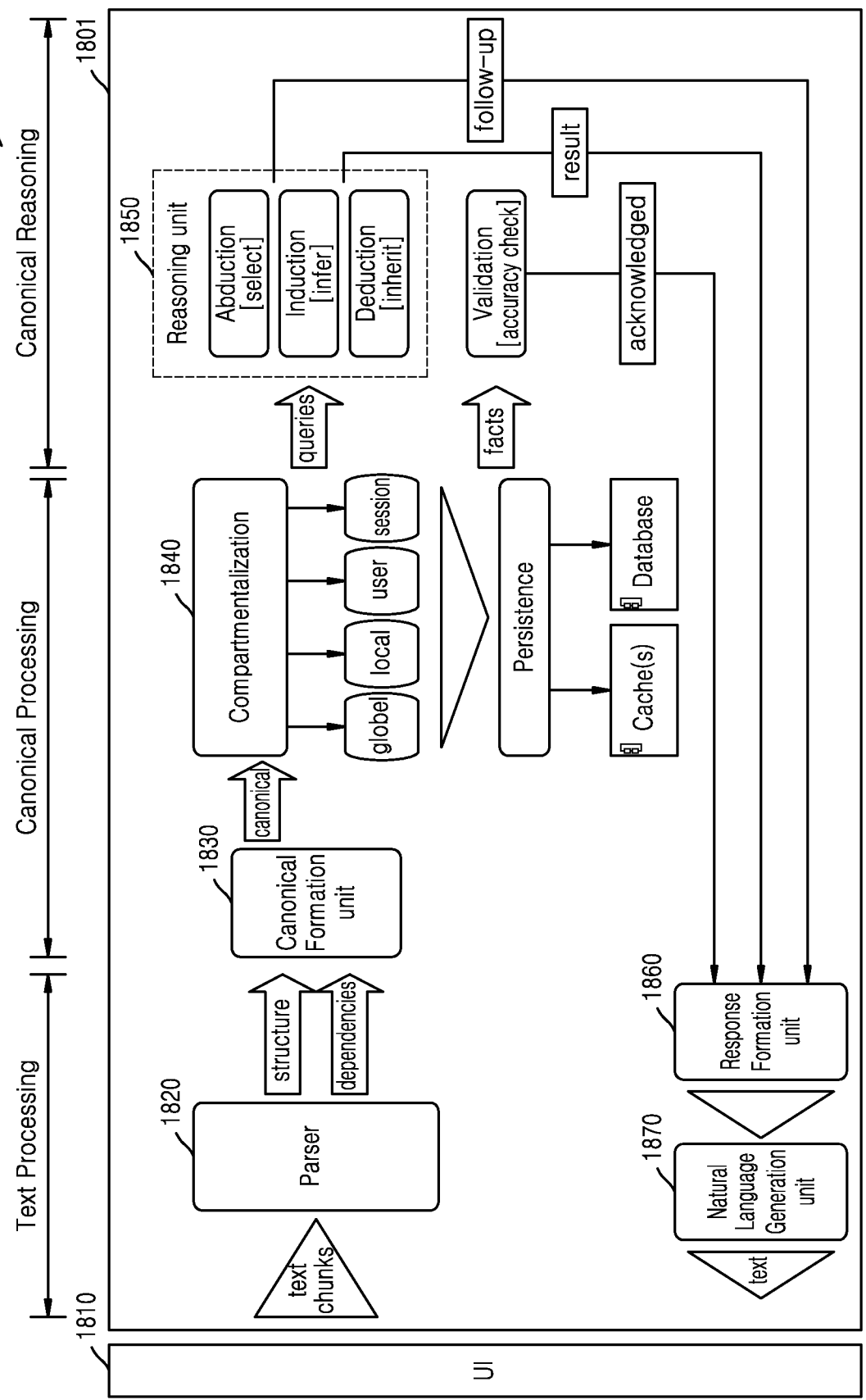
FIG. 18 shows system hardware and canonical formation according to an embodiment of the disclosure.

Referring to FIG. 18, a user interface 1810 and a processor 1801 may be provided.

The processor 1801 may be configured with a parser 1820, a canonical formation unit 1830, a reasoning unit 1850, a response formation unit 1860, and a natural language generation unit 1870.

Other aspects of the disclosure will become apparent from the following description of an embodiment of the disclosure when considered in conjunction with the drawings.

It will be understood by one of ordinary skill in the art that other embodiments of the disclosure are possible and details of the disclosure can be modified in various aspects without deviating from the concepts of the disclosure.

Accordingly, the drawings and descriptions should be considered illustrative rather than restrictive.

In the accompanying claims, the singular forms "a", "an" and "the" are intended to include the plural forms as well, unless the context clearly indicates otherwise.

What is claimed is:

1. A computer-implemented data processing method, the method comprising:
receiving, by a user interface of a computer system, a first natural language input from a user, the first natural language input comprising one or more sentences each including a first verb, a first object, and a second object, the user interface electrically coupled to a parser of the computer system;
parsing, by the parser, the first natural language input, received from the user interface, into a first sentence structure and a first dependency relation between words in a sentence of the first sentence structure;
establishing, by a processor of the computer system, a basic data structure based on the first sentence structure and the first dependency relation of the parsed first natural language input, the basic data structure having a triangle shape, the data basic data structure configured with a first node being a primary node, a second node being a context node, a third node being a resultant node, a first link connecting the first node to the second node and configured to assign a first attribute of abductive reasoning between the first node and the second node, a second link connecting the second node to the third node and configured to assign a second attribute of inductive reasoning between the second node and the third node, and a third link connecting the first node to the third node and configured to assign a third attribute of deductive reasoning between the first node and the third node, wherein the establishing of the basic data structure comprises at least one of:
analyzing, by the processor, the first verb, the first object, and the second object included in the first natural language input, and assigning the first object to the first node and the second object to the third node when the first object and the second object are equivalent or similar entities and the first object is a subclass of the second object such that the deductive reasoning is performed, by the processor, between the first object in the first node and the second object in the third node; or
assigning, by the processor, the first object to the first node and the second object to the second node based on the analysis of the first verb included in the first natural language input and the analysis indicating that the second object included in the first natural language input represents a feature of the first object such that the abductive reasoning is performed, by the processor, between the first object in the first node and the second object in the second node;
assigning, by the processor, a set of computer-readable primitive symbols to the first, second and third attributes of the first to third links, the set of computer-readable primitive symbols representing a level of semantics induced when a component is positioned at a certain location in the basic data structure;
receiving, by the user interface, one or more second natural language inputs related to and different from the first natural language input, each of the one or more second natural language inputs comprising a second verb, a third object, and a fourth object, and having an identical sentence structure to that of a sentence of the first natural language input;
analyzing, by the processor, the second verb, the third object, and the fourth object to determine 1) whether the third object and the fourth object are equivalent or similar entities and the third object is a subclass of the fourth object or 2) whether the fourth object represents a feature of the third object;

in response to the deductive reasoning being performed between the first object in the first node and the second object in the third node and in response to determining that the third object and the fourth object are equivalent or similar entities and the third object is a subclass of the fourth object, assigning, by the processor, the third object to the first node and the fourth object to the second node such that the inductive reasoning is performed, by the processor, between the fourth object in the second node and the second object in the third node;

in response to the abductive reasoning being performed between the first object in the first node and the second object in the second node and in response to determining that the fourth object represents a feature of the third object, assigning, by the processor, the third object to the first node and the fourth object to the third node such that the inductive reasoning is performed, by the processor, between the second object in the second node and the fourth object in the third node;

controlling, by the processor, the user interface to output a confirmation message to the user in response to receiving the one or more second natural language inputs;

receiving, by the user interface, a natural language query, relating to at least one of the first natural language input or the one or more second natural language inputs, from the user, the natural language query including a third verb, a fifth object, and a sixth object at least one of which is identical to at least one of the first verb, the second verb, the first object, the second object, the third object, or the fourth object;

parsing, by the parser, the natural language query, received from the user interface, into a second sentence structure and a second dependency relation between words in a sentence of the second sentence structure;

analyzing, by the processor, the second sentence structure and the second dependency relation of the parsed natural language query and the set of computer-readable primitive symbols to determine a mapping between one or more of the first node, the second node, the third node, the first link, the second link, or the third link included in the basic data structure and one or more of the second verb, the third verb, the third object, the fourth object, the fifth object, or the sixth object;

generating, by the processor, a natural language response to the natural language query by selecting one of the first verb, the second verb, or the third verb, and two of the first object, the second object, the third object, the fourth object, the fifth object, or the sixth object based on the mapping; and displaying, by the user interface, the natural language response, the set of computer-readable primitive symbols comprising first, second and third computer-readable primitive symbols different from each other and respectively associated with the deductive reasoning, the abductive reasoning, and the inductive reasoning.

2. The data processing method of claim 1, wherein the establishing of the basic data structure based on the natural language input comprises analyzing the verb, the first object, and the second object included in the natural language, and assigning the verb to the third link when the relation between the first object and the second object is the equivalent or similar entity.

3. The data processing method of claim 1, wherein the establishing of the basic data structure based on the natural language input comprises assigning the verb to the first link when the second object included in the natural language represents the feature of the first object, according to the analysis of the verb included in the natural language.

4. The data processing method of claim 1, wherein at least one of the first node, the second node, the third node, the first link, the second link, and the third link further includes another basic data structure included in a corresponding node or a corresponding link, according to complexity of the natural language.

5. The data processing method of claim 1, further comprising at least one of expanding an additional node from the first node, expanding an additional node from the second node, and expanding an additional node from the third node, based on complexity of the natural language.

6. The data processing method of claim 5, wherein, in the expanding of the additional node from the first node, the first node becomes a context node in an expanded basic data structure, and the additional node becomes a resultant node in the expanded basic data structure.

7. The data processing method of claim 5, wherein, in the expanding of the additional node from the first node, the first node becomes a context node in an expanded basic data structure, and the additional node becomes a primary node in the expanded basic data structure.

8. The data processing method of claim 5, wherein, in the expanding of the additional node from the second node, the second node becomes a primary node in an expanded basic data structure, and the additional node becomes a context node in the expanded basic data structure.

9. The data processing method of claim 5, wherein, in the expanding of the additional node from the second node, the second node becomes a primary node in an expanded basic data structure, and the additional node becomes a resultant node in the expanded basic data structure.

10. The data processing method of claim 5, wherein, in the expanding of the additional node from the third node, the third node becomes a primary node in an expanded basic data structure, and the additional node becomes a context node in the expanded basic data structure.

11. The data processing method of claim 5, wherein, in the expanding of the additional node from the third node, the third node becomes a primary node in an expanded basic data structure, and the additional node becomes a resultant node in the expanded basic data structure.

12. The data processing method of claim 1, wherein the first object, the second object, the third object, and the fourth object are a word configured with a natural language or a combination of words configured with the natural language.

13. A non-transitory computer-readable recording medium storing instructions, when executed by one or more processors, configured to perform the method of claim 1.

14. The method of claim 1, wherein the set of computer-readable primitive symbols comprises one or more of 1) ? representing query, potential, or some, 2) { } representing none, absence, or not, 3)} {representing all, any, or is, 4)< >representing bind or has, or 5) ><representing open or goes.

15. A computer apparatus comprising:
a user interface configured to:
receive a first natural language input from a user, the first natural language input comprising one or more sentences each including a first verb, a first object, and a second object;

receive one or more second natural language inputs related to and different from the first natural language input, each of the one or more second natural language inputs comprising a second verb, a third object, and a fourth object, and having an identical sentence structure to that of a sentence of the first natural language input; and receive a natural language query, relating to at least one of the first natural language input or the one or more second natural language inputs, from the user, the natural language query including a third verb, a fifth object, and a sixth object at least one of which is identical to at least one of the first verb, the second verb, the first object, the second object, the third object, or the fourth object;

a parser electrically coupled to the user interface and configured to:

parse the first natural language input, received from the user interface, into a first sentence structure and a first dependency relation between words in a sentence of the first sentence structure; and parse the natural language query, received from the user interface, into a second sentence structure and a second dependency relation between words in a sentence of the second sentence structure; and a processor configured to:

establish a basic data structure based on the first sentence structure and the first dependency relation of the parsed first natural language input, the basic data structure having a triangle shape, the data basic data structure configured with a first node being a primary node, a second node being a context node, a third node being a resultant node, a first link connecting the first node to the second node and configured to assign a first attribute of abductive reasoning between the first node and the second node, a second link connecting the second node to the third node and configured to assign a second attribute of inductive reasoning between the second node and the third node, and a third link connecting the first node to the third node and configured to assign a third attribute of deductive reasoning between the first node and the third node, to establish the basic data structure, the processor configured to perform at least one of:

analyzing the first verb, the first object, and the second object included in the first natural language input, and assigning the first object to the first node and the second object to the third node when the first object and the second object are equivalent or similar entities and the first object is a subclass of the second object such that the deductive reasoning is performed, by the processor, between the first object in the first node and the second object in the third node; or assigning the first object to the first node and the second object to the second node based on the analysis of the first verb included in the first natural language input and the analysis indicating that the second object included in the first natural language input represents a feature of the first object such that the abductive reasoning is performed, by the processor, between the first object in the first node and the second object in the second node;

assign a set of computer-readable primitive symbols to the first, second and third attributes of the first to third links, the set of computer-readable primitive symbols representing a level of semantics induced when a component is positioned at a certain location in the basic data structure;

analyze the second verb, the third object, and the fourth object to determine 1) whether the third object and the fourth object are equivalent or similar entities and the third object is a subclass of the fourth object or 2) whether the fourth object represents a feature of the third object;

in response to the deductive reasoning being performed between the first object in the first node and the second object in the third node and in response to determining that the third object and the fourth object are equivalent or similar entities and the third object is a subclass of the fourth object, assign the third object to the first node and the fourth object to the second node such that the inductive reasoning is performed, by the processor, between the fourth object in the second node and the second object in the third node;

in response to the abductive reasoning being performed between the first object in the first node and the second object in the second node and in response to determining that the fourth object represents a feature of the third object, assign the third object to the first node and the fourth object to the third node such that the inductive reasoning is performed, by the processor, between the second object in the second node and the fourth object in the third node;

control the user interface to output a confirmation message to the user in response to receiving the one or more second natural language inputs;

analyze the second sentence structure and the second dependency relation of the parsed natural language query and the set of computer-readable primitive symbols to determine a mapping between one or more of the first node, the second node, the third node, the first link, the second link, or the third link included in the basic data structure and one or more of the second verb, the third verb, the third object, the fourth object, the fifth object, or the sixth object;

generate a natural language response to the natural language query by selecting one of the first verb, the second verb, or the third verb, and two of the first object, the second object, the third object, the fourth object, the fifth object, or the sixth object based on the mapping; and control the user interface to display the natural language response, the set of computer-readable primitive symbols comprising first, second and third computer-readable primitive symbols different from each other and respectively associated with the deductive reasoning, the abductive reasoning, and the inductive reasoning.

* * * * *